March 11, 1941.                J. LOBSTEIN                    2,234,347
            ELECTRIC SMOOTHING IRON AND IN SUPPORT FORMING CURRENT
                         SUPPLY PLUGS FOR SAID IRONS
                    Filed Nov. 15, 1938            3 Sheets-Sheet 1

INVENTOR:
JEAN LOBSTEIN
BY Haseltine, Lake & Co.
ATTORNEYS

March 11, 1941.                J. LOBSTEIN                    2,234,347
         ELECTRIC SMOOTHING IRON AND IN SUPPORT FORMING CURRENT
                      SUPPLY PLUGS FOR SAID IRONS
                    Filed Nov. 15, 1938        3 Sheets-Sheet 2
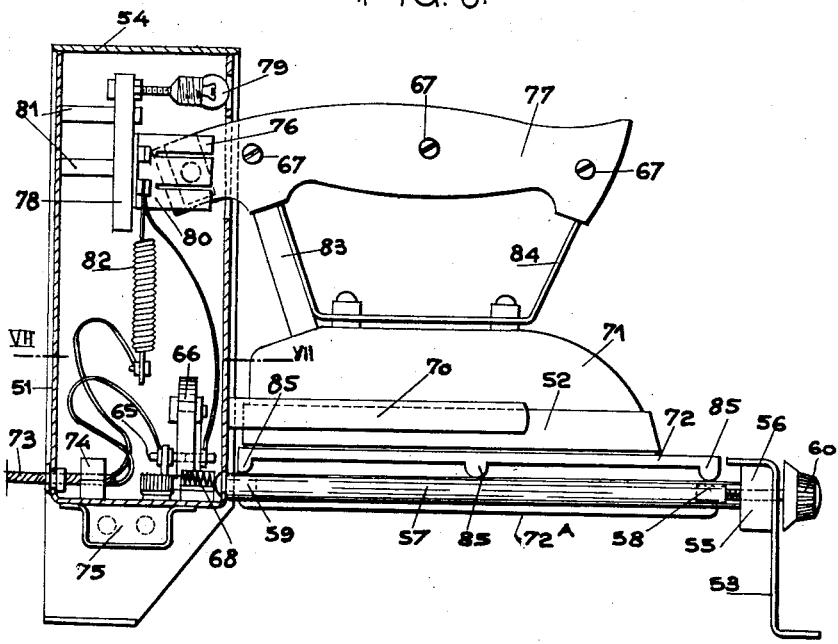
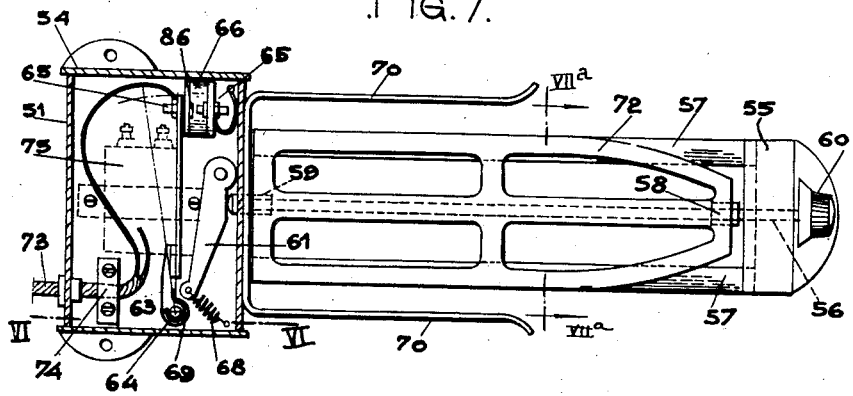
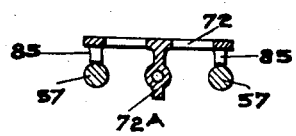
INVENTOR:
JEAN LOBSTEIN
BY: Haseltine, Lake & Co.
ATTORNEYS March 11, 1941.  J. LOBSTEIN  2,234,347
ELECTRIC SMOOTHING IRON AND IN SUPPORT FORMING CURRENT
SUPPLY PLUGS FOR SAID IRONS
Filed Nov. 15, 1938   3 Sheets-Sheet 3
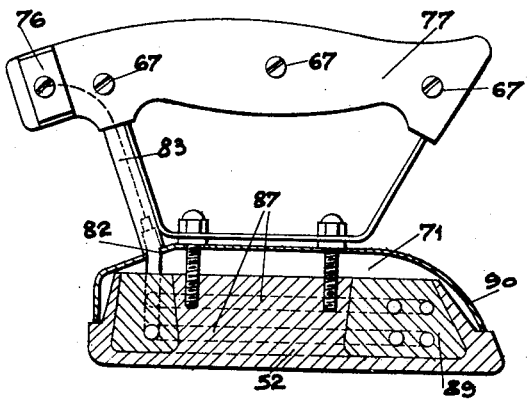
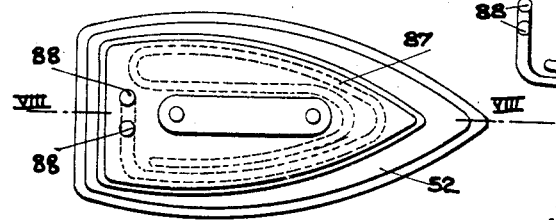
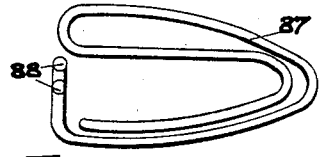
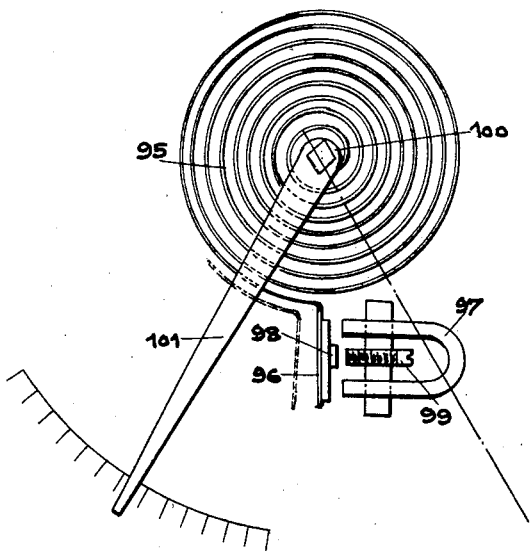
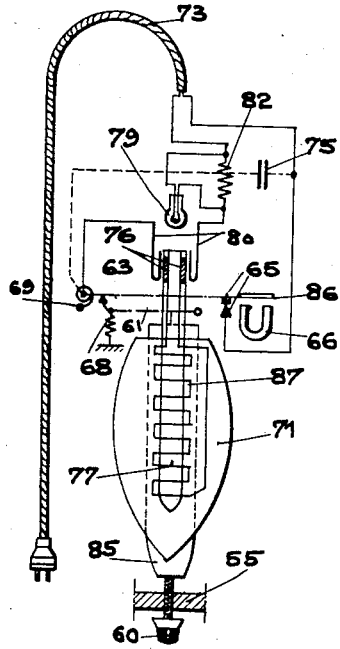
INVENTOR:
JEAN LOBSTEIN
BY: Haseltine, Lake & Co.
ATTORNEYS Patented Mar. 11, 1941

2,234,347

UNITED STATES PATENT OFFICE 2,234,347

ELECTRIC SMOOTHING IRON AND IN SUPPORT FORMING CURRENT SUPPLY PLUGS FOR SAID IRONS

Jean Lobstein, Paris, France

Application November 15, 1938, Serial No. 240,449
In France November 18, 1937

7 Claims. (Cl. 219—25)

The present invention has for its object improvements in electric smoothing irons and in supports forming current supply plugs for said irons.

The applicant has already proposed improvements in the current supply plugs for said smoothing irons, said improvements being described and illustrated in his co-pending U. S. application Serial No. 163,368 filed on September 11, 1937.

For the particular application to ironing for example, the apparatus comprises a frame of appropriate shape on which is mounted that part of a current supply plug which is supplied by a source of electric energy. The other part of said plug is mounted on the apparatus used (a smoothing iron for example).

By placing the smoothing iron on the supporting frame, the electric connection is made and the iron is heated.

In order to iron without a wire and without stopping, it will therefore suffice to have two irons available, one undergoing heating while the other is working; the power of the heating elements lodged in the irons is such that the time required to raise the temperature of an iron a given amount is shorter than the time required to lower the temperature of the iron the same amount. The user can therefore iron without a wire and without interruption between two limits of temperature which are sufficiently close together to obtain excellent work with high efficiency.

It is also possible to use a thermostat which is lodged in the frame and the thermic control member of which is in direct contact with the sole of the iron. The thermostat actuates a switch having a great opening and closing power, the operation of which keeps the temperature of the iron at a selected degree which is adjustable according to the work to be effected.

The thermostat used in an embodiment is of substantially equal length to that of the iron and the sheath of said thermostat is in direct contact with the sole of the iron; this arrangement ensures great accuracy in the adjustment of the temperature.

One object of the invention consists more particularly in constructing an iron of which the extended handle acts at the same time as a plug.

This arrangement is very advantageous in carrying out certain work which requires the use of the heel of the iron in an almost vertical position of the latter. In this position, any plug which is fixed on the cover of the iron and projecting from same forms an inconvenience for the user. By using the handle of the iron as a plug, any contact member which may catch the cloth is eliminated and at the same time the fragility of the connections is reduced, the latter being reduced to a simple conductor which is fixed to the heating element and leads at the other end to the contact fixed on the handle, without passing through a system of plugs or other intermediate connections.

This detail of construction furthermore offers the advantage of eliminating any overheating of the plug which is on the one hand remote from the hot parts of the iron, and on the other hand arranged in the actual extension of the force which acts to place the iron on its support or to remove same therefrom.

By using irons which are of great specific power, it is possible to iron without interruption very damp pieces with a small variation of the temperature of the irons during the work, the consumption of electricity remaining exactly in proportion to the work done.

Other objects of the invention are as follows:

(a) The support itself forms a part of the thermostat of which the expansion member forms the plate which directly supports the iron.

(b) The horizontal part of the support forms the low expansion element of the thermostat, said element being preferably formed by two rods having a low coefficient of expansion; the expansible element which forms a plate rests on said rods, is provided with a central rib arranged between said rods and bears, on the one hand, against an adjustable stop, and on the other hand on an amplifying system.

(c) The expansible plate of the support acts on the mechanical amplification system through the intermediary of one or a plurality of levers, the last of which controls the opening and the closing of the main circuit, said levers being directly mounted on the support.

(d) The lamp which checks the opening and closing of the thermostat is supplied through a shunt placed in the main circuit; this arrangement enables a low voltage incandescent lamp to be used which is not very fragile.

(e) The iron is provided with a tubular heating element which is embedded in a metal alloy poured into the sole of the iron, said sole being hollow and of appropriate shape.

This construction enables high power irons to be obtained while ensuring a very long life for the heating element owing to the perfect transmission of its heat to the whole of the metal mass forming the iron.

(f) The apparatus according to the invention comprises in combination and in the same simple, double or multiple unit, the thermostatic support, the irons constructed according to the previously described features and the optical signalling device by means of a low voltage incandescent lamp.

The invention further covers an embodiment of a support forming a current supply plug, which is characterized by the fact that the thermostatic element is formed by a bi-metallic blade which is wound in a spiral and placed a very short distance below the iron of which it controls the temperature.

The invention includes within its scope the novel application of a bi-metallic blade wound in a spiral, to a support forming a current supply plug for controlling the temperature of a smoothing iron.

The apparatus according to the invention enables all ironing work to be effected without a wire, without interruption and at the optimum temperature desired, that is to say with the highest efficiency.

The invention further covers other particular points which will become apparent from the ensuing description taken in conjunction with the accompanying drawings which is given solely by way of example and in which:

Fig. 6 is an overall elevation in partial section taken along the line VI—VI of Fig. 7 and showing an embodiment of an improved support according to the invention.

Fig. 7 is a plan view in section along the line VII—VII of the previous figure.

Fig. 7A is a section taken along the line VIIA—VIIA of Fig. 7.

Fig. 8 is an elevation of an iron constructed according to the invention, in partial section along the line VIII—VIII of Fig. 9.

Fig. 9 is a plan view of the sole of the iron shown in the previous figure, the cover being removed to show the arrangement of the heating element.

Fig. 10 is a plan view of the heating element.

Fig. 11 is a diagram of the electric connections effected.

Fig. 12 is a plan view of a thermostatic system having a spiral bi-metallic blade.

Reference will first of all be had to Figs. 1 to 5. The support comprises a frame 1 which is shaped to form a plate 1ª. In said support is mounted a thermostat 6, the tubular body 22 of which is enclosed in a metal sheath on which rests the sole of the iron 2 which directly transmits its heat to the body of the thermostat.

Figure 1:
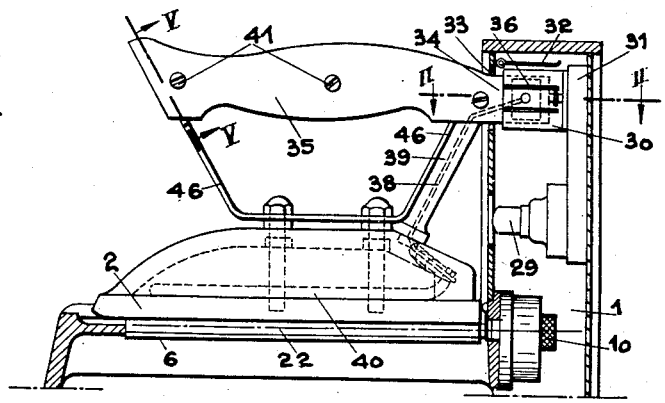
Fig. 1 is an overall elevation in partial section taken along the line I—I of Fig. 2 and showing a first embodiment of an improved support and of its iron according to the invention.
Figure 2:
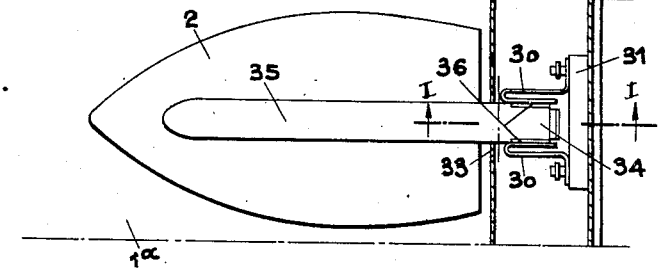
Fig. 2 is a plan view with a section taken along the line II—II of the previous figure.

The part of the current supply plug which is secured to the support and which is more particularly shown in the embodiment of Figs. 1 and 2, comprises two jaws 30 fixed on an insulating part 31 which is secured to the base; a pilot lamp 29 controlling the opening and the closing of the thermostat. A flap 32 or any other appropriate device is provided, as illustrated, for closing the opening 33 (through which the plug 34 passes) when the iron is not resting on the support. Said flap falls down again by gravity and may form a protection as is required to meet certain regulations relating to apparatus for domestic use.

The part 34 which forms the plug secured to the iron is formed by the extended rear part of the handle 35 of the iron. Said extended part carries two lateral contacts formed by conducting plates 36 which are adapted to engage between the jaws 36 when the iron is resting on its support.

Fig. 1 shows in dotted lines the internal arrangement of the iron and the path of the conducting wires 38 which pass through an insulating sheath 39 and lead to the heating element 40 of the iron and to the contacts 36 of the handle.

For questions of manufacture and in order to facilitate mounting, the handle 35 is made in two symmetrical parts which are connected together by screws 41.

In the case in which light or slightly damp pieces are being ironed, the power of the heating elements is between 400 and 600 watts for a normal iron. Said power is raised to 800–1000 watts and more when it is required to iron large very damp pieces or to use irons of large dimensions.

As said power is considerably higher than that of irons used with wires for small ironing work, the present patent of invention therefore provides for the use of heating elements which are specially designed to suit still better the principle set forth in the main patent, that is to say ironing dry or very damp pieces at the desired optimum temperature without a wire and without interruption, therefore with maximum efficiency.

Said heating elements are of the shielded type in which the resistance wire is either embedded in a special insulating material which protects it from the air, or lodged with its insulation in a tubular sheath.

The shielding of the heating element, at the same time as it acts as a protection, acts as a thermic connection between the sole and the counter-sole of the iron, thereby improving the thermic capacity of the iron.

In another design, the tubular heating element which is suitably bent on itself, can be lodged in channels provided in the sole and the counter-sole or again be directly embedded during casting in the sole of the iron.

In this latter case, in order to have a sufficient volume available, the tubular element may involve the whole of the sole and counter-sole unit, which are in that case formed by one and the same block of metal.

In a practical construction of said support called "Selful," the support, the adjustable thermostat or thermostats, the current supply plug or plugs with an optical or acoustic signalling device and the irons constructed according to the principles which have just been set forth, are grouped in the same simple, double or multiple unit.

Figure 3:
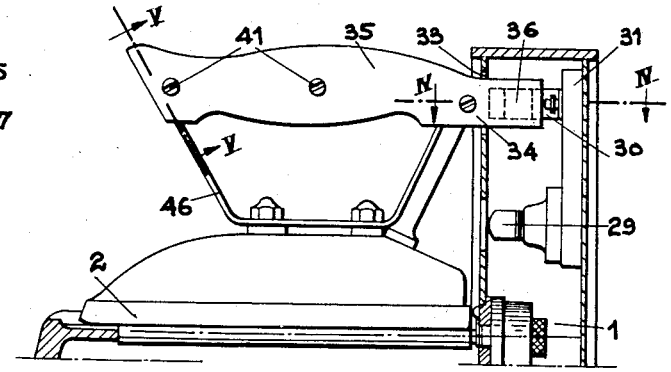
Fig. 3 is an overall elevation of another embodiment with partial section taken along the line III—III of Fig. 4.
Figure 4:
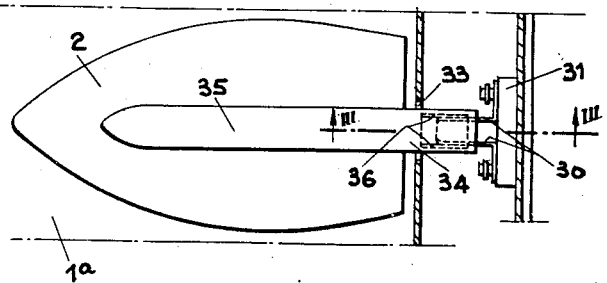
Fig. 4 is a plan view with a section taken along the line IV—IV of the previous figure.

Figs. 3 and 4 illustrate a modification of construction in which the extended rear part 34 of the handle 35 is hollowed out and forms the female part of the plug. The contacts or conducting plates 36 are arranged in the cavity of the extension 34 and the male part of the plug is formed by two blades 30 secured to an insulating part 31 which is secured to the support.

This arrangement enables the dimensions of the passage opening for the part 34 to be sufficiently reduced for it to be useless to consider the use of a closing system such as a flap or the like when the iron is not resting on its support.

Figure 5:
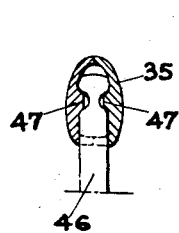
Fig. 5 is a section taken along the line V—V of Fig. 1 or of Fig. 3 and showing a mounting detail.

It will also be observed that the handle becomes automatically fixed on the arms 46 when the two elements of the handle are connected together by means of the screws 41. In fact, the two elements of the handle are provided with internal projections 47, as illustrated in Fig. 5, which engage in corresponding notches of the arms 46.

In a modification, not shown, the handle is no longer extended at its rear part, but at its front part in order to form the plug.

The extended handle is applicable in an identical manner in the case of a handle for a tailor's iron.

Reference will now be had to Figs. 6, 7 and 7A. The support comprises a U-shaped sheet metal case 51 on which is fixed a sheet metal cover 54 which carries at its lower part two of the feet of the support. At the lower part of the case 51 two rods 57 made of metal having a low coefficient of expansion are firmly fixed by means of nuts, the opposite ends of said rods being connected together by a thick part 55 on which is fixed a sheet metal part 53 forming the third foot of the support.

A plate 72 made of metal having a high coefficient of expansion rests by means of a number of bosses 85 on the rods 57 in such a manner that the transmission of heat between the parts 72 and 57 is as small as possible.

The plate 72 carries a lower rib 72a at the ends of which are fixed the hard metal parts 58 and 59. The part 58 is adapted to abut against the screw 56 which carries a knurled knob 60 the pointer of which moves in front of a dial which is fixed on the part 59, said dial being graduated in degrees centigrade. The part 59 abuts against a lever 61 the spindle 62 of which is directly fixed on the sheet metal case 51; a spring 69 holds the lever 61 in contact with the part 59. This first lever 61 acts on a second amplifying lever 63 the spindle of which is at 64; a spiral spring 69 acts on the lever 63 and presses it against the end of the first lever 61, all the movements of which it thus follows:

The lever 63 carries, at its end opposite the spindle 64, an armature made of magnetic metal which is adapted to come into register with the arms of a magnet 66; this end of the lever 63 also carries a contact part 65 which forms the movable contact of the thermostat.

A second contact 65 is fixed on the part which carries the magnet 66, said second contact being fixed relatively to the support.

At the upper part and inside the cover is fixed by means of parts 81, an insulating part 78 on which are mounted the two brass jaws 80 and a low voltage lamp 79 supplied by the shunt 82.

The apparatus is supplied by a two conductor flexible cord 73, the end of which is clamped in the connection 74.

The smoothing iron 71 being suitably placed on the support, its sole 52 rests directly on the expansible plate 72 at the same time as its handle 77 forming a plug comes into contact with the jaws 80 by the action of the two contact members 76 which are fixed at the end of the handle 77. Said contact members 76 are directly connected to the heating element 87 by flexible leads passing through the sheath 83.

Two guide arms 76 hold the iron in a suitable position on the support and facilitate the introduction of the handle forming a plug into the corresponding jaws 80.

When the apparatus is used on alternating current, the sparks caused by the opening and closing of the contacts 65 have no destructive action on said contacts, a fortiori since the separation and the approach of said contacts are effected at high speed under the action of the magnet 66 or of a mechanical device of the tumbler type.

In the case of use of the apparatus on direct current, a condenser 75 is connected across the contacts 65 so as to reduce the sparks caused by the opening and the closing to an acceptable value.

For constructing high power irons while ensuring a long life for the heating element, the present invention provides a particular construction of the irons as will appear from the ensuing description.

Fig. 8 shows an iron of which the metal sole 52 is hollow and receives a tubular heating element 87 which is suitably bent on itself and the length of which is proportional to the power to be obtained.

The heating element 87 being placed in the sole 52, an appropriate alloy 89 is poured into the sole and perfectly surrounds the heating element of which only the ends 88 emerge from the sole. The internal shape of the sole 52 is designed to ensure the best thermic transmission between the heating element and the sole forming the body of the iron passing through the intermediate alloy 89. A central boss cast with the sole further improves the thermic exchange surface and said boss is used for firmly fixing the handle of the iron by means of two threaded studs.

A cover 90 completes the iron and reduces the losses by radiation to a minimum and the handle 77 forming a plug is made in two symmetrical parts made of moulded material which are assembled together by screws 67.

The fixing of said handle on the handle support 91 is effected in a very simple manner.

The operation of the apparatus can be readily explained by following the diagram of Fig. 11.

The expansible plate being cold, the contacts 65 are in the closed position and the current flows through the heating element 87 of the iron 71; as the shunt 82 is in the main circuit, the lamp 79, which uses the voltage drop in the shunt, is supplied and lights. As it gets hot, the iron transmits its heat to the plate 85 which lengthens until it abuts against the first amplifying lever 61 which is pushed by the plate and acts in turn on the second lever 63 until it produces the separation of the contacts 65, that is to say the opening of the circuit and the extinguishing of the lamp 79. Left to itself, the iron cools at the same time as the expansible plate, the levers 61 and 63 which are urged by the springs 68 and 69 following the contraction of the plate and the contacts 65 closing the circuit again as soon as the iron has cooled sufficiently.

By acting on the screw 60, it is possible to reduce or increase at will the temperature at which the plate 85 acts on the amplifying levers 61 and 63 and thereby modify the temperature of the iron according to the work to be done.

The circuit being closed again, the iron heats a few degrees and causes the contacts to open again and so forth; the variation of the temperature of the iron between an opening and a closing of the circuit can be reduced to a few degrees by giving the levers 61 and 63 a suitable coefficient of amplification.

In the previously described support, the thermostat forms the actual elements of said support contrary to what was stated in the U. S. Patent application Serial No. 163,368 which describes a support in which is mounted a thermostat that is independent of said support.

Fig. 12 shows a diagrammatically plan view of an embodiment of a support forming a current supply plug in which the thermostatic element is formed, according to a feature of the invention, by a bi-metallic blade 95 which is wound in a flat spiral. Said bi-metallic blade is placed in the immediate vicinity of the sole of the iron and below the same.

In this embodiment, the free outer end 96 comes into register with the poles of a magnet 97 which causes a sudden opening and closing of the contacts 98 and 99 included in the main circuit. The inner end is secured to a shaft 100 on which is fixed a ratchet or lever 101, the end of which moves in front of a graduation 102 so as to adjust the temperature at which the breaking of the circuit is to be effected.

By modifying the characteristics of the bi-metallic blade (length, width, thickness) any desired sensitivity may be obtained and a sufficient torque to produce a very definite opening and closing of the contacts 98 and 99.

The arrangement described in the present invention enables a particularly rugged apparatus to be constructed of which all the parts are perfectly accessible.

The shape and the dimensions of the support may be modified at will to receive irons of different weights, from the iron for domestic use to the tailor's iron.

It is obvious that the embodiments given hereinbefore are only mere examples. In a general manner, all modifications or variations which in no way change the main features explained above, or the purpose aimed at, remain included in the scope of the present invention.

What I claim as my invention and desire to secure by Letters Patent is:

1. In an electric smoothing iron provided with a working sole, with a grasping and manipulating handle, and with a plug adapted to engage with a corresponding plug member of a support forming a current supply plug, the handle extended and arranged at one end to form said plug of the smoothing iron, said sole adapted to form a housing and a central projection, a tubular heating element placed in said housing, a metal alloy poured into the housing and embedding said heating element in said housing, means for fixing the handle of the iron to the central projection of the working sole, and electric connecting wires for connecting said tubular heating element to the plug arranged at the end of the handle.

2. In an electric smoothing iron provided with a working, sole with a grasping and manipulating handle and with a plug adapted to engage with a corresponding plug member of a support forming a current supply plug, the handle of said iron extended and arranged at one end to form said plug of the smoothing iron, said handle being hollow and in particular U-shaped so as to enable a sufficiently small opening to be provided in said support to pass said plug which is to engage with the corresponding plug member of the support.

3. In an electric smoothing iron provided with a working sole, with a grasping and manipulating handle and with a plug adapted to engage with a corresponding plug member of a support forming a current supply plug, the handle extended and arranged at one end to form said plug of the smoothing iron, said sole being adapted to form a housing and a central projection, a tubular heating element placed in said housing, a metal alloy poured into the housing and embedding said heating element in said housing, arms extending from the projection of the sole towards the handle, means for fixing said arms to said projection, the handle being made in two parts to fit and fasten on the ends of said arms, and means for connecting together the two parts forming the handle.

4. In a support forming a current supply plug for receiving an electric iron provided with a plug adapted to fit the plug of the support, the horizontal part of the support forming the low expansion element of the thermostat, said part being formed by two rods having a low coefficient of expansion whereas the expansible element forming a plate rests on said rods and is provided with a central rib which is arranged between said rods and bears, on the one hand against an adjustable stop, and on the other hand on an amplifying system.

5. In a support forming a current supply plug as specified in claim 4, the expansible plate of the support acting on the mechanical amplifying system through the intermediary of one or a plurality of levers, the last of which controls the opening and the closing of the main circuit, said levers being directly mounted on the support.

6. In a support forming a current supply outlet for receiving an electric iron having a corresponding plug means fitting the current supply outlet of the support, the combination of a thermostatic contact-breaker on said support including a spirally wound bi-metallic blade placed a very short distance below the iron of which it controls the temperature, there being a magnet on the support, the outer free end of the spirally wound bi-metallic blade being adapted to come into register with the poles of said magnet which effects a sudden opening and closing of the contacts included in the main circuit.

7. In a support forming a current supply plug for receiving an electric iron provided with a plug fitting the plug of the support, in combination, a frame forming a plate made of incombustible material, a plug mounted on the frame and adapted to receeive the corresponding part of a plug mounted on the electric iron, a thermostatic element arranged under the plate and consisting of a bi-metallic blade spirally wound and placed a very short distance below the iron the temperature of which it controls, the free outer end of the spirally wound bi-metallic blade coming opposite the poles of a magnet which ensures a sudden opening and closing of the contacts included in the main circuit, where as the center of the spiral is mounted on a spindle controlled by a lever acting as pointer and thus allowing the opening and closing temperature of the circuit to be adjusted beforehand.

JEAN LOBSTEIN.